US012551796B1

(12) United States Patent
Ulmer et al.

(10) Patent No.: US 12,551,796 B1
(45) Date of Patent: Feb. 17, 2026

(54) SYSTEMS AND METHODS FOR TEMPORARILY CEDING CONTROL OVER UNIQUE DIGITAL ARTICLES FOR PLAYER-SPECIFIED TASKS

(71) Applicant: Mythical, Inc., Sherman Oaks, CA (US)

(72) Inventors: Laura Ann Ulmer, Federal Way, WA (US); Sung Meen Hong, Pleasanton, CA (US)

(73) Assignee: Mythical, Inc., Sherman Oaks, CA (US)

( * ) Notice: Subject to any disclaimer, the term of this patent is extended or adjusted under 35 U.S.C. 154(b) by 559 days.

(21) Appl. No.: 17/940,634

(22) Filed: Sep. 8, 2022

(51) Int. Cl.
*A63F 13/35* (2014.01)
*A63F 13/55* (2014.01)
*A63F 13/77* (2014.01)

(52) U.S. Cl.
CPC .............. *A63F 13/55* (2014.09); *A63F 13/35* (2014.09); *A63F 13/77* (2014.09)

(58) Field of Classification Search
CPC .......... A63F 13/55; A63F 13/35; A63F 13/77
USPC ......................................................... 463/31
See application file for complete search history.

(56) References Cited

U.S. PATENT DOCUMENTS

| | | | |
|---|---|---|---|
| 8,272,961 B2 | 9/2012 | Busey | |
| 9,440,151 B2 | 9/2016 | Van Luchene | |
| 10,518,178 B1 | 12/2019 | Cunningham | |
| 10,850,202 B1 | 12/2020 | Koch | |
| 10,861,095 B1 | 12/2020 | Koch | |
| 10,984,400 B1 | 4/2021 | Koch | |
| 11,138,580 B1 | 10/2021 | Koch | |
| 11,141,664 B1 | 10/2021 | Koch | |
| 11,207,604 B1 | 12/2021 | Koch | |
| 11,260,304 B1 | 3/2022 | Koch | |
| 2001/0018366 A1 | 8/2001 | Shimomura | |
| 2003/0109299 A1 | 6/2003 | Reizei | |
| 2004/0147308 A1 | 7/2004 | Walker | |
| 2006/0017229 A1 | 1/2006 | Hayakawa | |

(Continued)

FOREIGN PATENT DOCUMENTS

KR    20090004844 A  *  1/2009  ............ H04W 12/64

OTHER PUBLICATIONS

GameFaqs, "How do you bet pink slips?" https://gamefaqs.gamespot.com/ps2/938452-juiced-2-hot-import-nights/answers/190010- how-do-you-bet-pink-slips. Created 2010. (Year: 2020) 1page.

(Continued)

*Primary Examiner* — Michael A Cuff
(74) *Attorney, Agent, or Firm* — Esplin & Associates, PC

(57) ABSTRACT

Systems and methods to facilitate temporary ceding of control over unique digital articles for performance of player-specified tasks are disclosed. Exemplary implementations may implement a permanent registry; execute instances of a game; manage player accounts associated with the players; invite other players to temporarily gain control over the unique digital articles during attempts to perform owner-specified tasks; record modifications to usage permissions of the unique digital articles to temporarily cede control; perform in-game actions using the unique digital articles during attempts to perform the owner-specified tasks; detect the end of the attempts; revert the modifications such that the owners gain back the control over the unique digital articles; and/or other steps.

20 Claims, 6 Drawing Sheets

(56) References Cited

U.S. PATENT DOCUMENTS

| | | |
|---|---|---|
| 2006/0258463 A1 | 11/2006 | Cugno |
| 2007/0191103 A1 | 8/2007 | Van Luchene |
| 2008/0033734 A1 | 2/2008 | Carry |
| 2008/0070689 A1 | 3/2008 | Van Luchene |
| 2008/0139318 A1 | 6/2008 | Van Luchene |
| 2008/0167122 A1 | 7/2008 | Maeda |
| 2008/0227512 A1 | 9/2008 | Lang |
| 2008/0229374 A1* | 9/2008 | Mick ............ G06F 16/78 725/93 |
| 2008/0234038 A1 | 9/2008 | Jiao |
| 2008/0303811 A1* | 12/2008 | Van Luchene ......... A63F 13/12 345/419 |
| 2009/0318221 A1 | 12/2009 | Dhunjishaw |
| 2012/0290977 A1 | 11/2012 | Devecka |
| 2013/0143670 A1 | 6/2013 | Junkin |
| 2013/0288788 A1 | 10/2013 | Lim |
| 2014/0045586 A1 | 2/2014 | Allen |
| 2014/0206452 A1 | 7/2014 | Bambino |
| 2015/0001799 A1 | 1/2015 | Cullen |
| 2015/0163311 A1 | 6/2015 | Heath |
| 2015/0265918 A1 | 9/2015 | Yamaguchi |
| 2015/0371499 A1 | 12/2015 | Sansregret |
| 2016/0005270 A1* | 1/2016 | Marr ............ G07F 17/3255 463/25 |
| 2018/0304159 A1 | 10/2018 | Campos |
| 2019/0180329 A1 | 6/2019 | Chetlur |
| 2019/0197831 A1 | 6/2019 | Batton |
| 2019/0236594 A1 | 8/2019 | Ehrlich-Quinn |
| 2019/0282906 A1 | 9/2019 | Yong |
| 2019/0299105 A1 | 10/2019 | Knight |
| 2019/0311341 A1 | 10/2019 | Rice |
| 2020/0155944 A1 | 5/2020 | Witchey |
| 2020/0202668 A1 | 6/2020 | Cotta |
| 2020/0294133 A1 | 9/2020 | Cella |
| 2020/0311721 A1 | 10/2020 | Ow |
| 2020/0320644 A1 | 10/2020 | Hollis |
| 2020/0357246 A1 | 11/2020 | Nelson |
| 2021/0019987 A1 | 1/2021 | Cohen |
| 2021/0027281 A1 | 1/2021 | Kilroe |
| 2021/0042830 A1 | 2/2021 | Burke |
| 2021/0118085 A1* | 4/2021 | Bushnell ............ H04L 9/50 |
| 2022/0215361 A1 | 7/2022 | Koch |
| 2022/0215362 A1 | 7/2022 | Koch |
| 2022/0266148 A1 | 8/2022 | Koch |
| 2022/0266154 A1 | 8/2022 | Koch |
| 2025/0272700 A1* | 8/2025 | Shapshal ............ G07D 7/2016 |

OTHER PUBLICATIONS

GauthierDickey & Ritzdorf, in "Secure Peer-to Peer Trading for Multiplayer Games," IEEE (Year: 2012).

\* cited by examiner

SYSTEMS AND METHODS FOR TEMPORARILY CEDING CONTROL OVER UNIQUE DIGITAL ARTICLES FOR PLAYER-SPECIFIED TASKS

FIELD OF THE DISCLOSURE

The present disclosure relates to systems and methods for temporarily ceding control over unique digital articles for player-specified quests or tasks.

BACKGROUND

Online gaming platforms are known. Many types of digital articles are known. Distributed or decentralized registries (or digital ledgers) are known tools and techniques to produce a secure record of rights pertaining to assets, articles, and transactions.

SUMMARY

One aspect of the present disclosure relates to a system configured to facilitate temporary ceding of control over unique digital articles for performance of player-specified tasks. The unique digital articles are correlated with correlated in-game entities configured to be used in instances of games within an online gaming platform. The system may include the online gaming platform, a registry server, and/or other components. The system may include one or more processors configured by machine-readable instructions. The system may be configured to implement a permanent registry. The system may be configured to execute instances of a game. The system may be configured to manage player accounts associated with the players. The system may be configured to invite other players to temporarily gain control over the unique digital articles during attempts to perform owner-specified tasks. The system may be configured to record modifications to usage permissions of the unique digital articles. The system may be configured to perform in-game actions using the unique digital articles during attempts to perform the owner-specified tasks. The system may be configured to detect the end of the attempts. The system may be configured to revert the modifications such that the owners gain back the control over the unique digital articles, and/or perform other steps.

Another aspect of the present disclosure related to a method of facilitating temporary ceding of control over unique digital articles for performance of player-specified tasks. The unique digital articles are correlated with correlated in-game entities usable in instances of games within an online gaming platform. The method may include implementing a permanent registry. The method may include executing instances of a game. implement a permanent registry managing player accounts associated with the players. The method may include inviting other players to temporarily gain control over the unique digital articles during attempts to perform owner-specified tasks. The method may include recording modifications to usage permissions of the unique digital articles. The method may include performing in-game actions using the unique digital articles during attempts to perform the owner-specified tasks. The method may include detecting the end of the attempts. The method may include reverting the modifications such that the owners gain back the control over the unique digital articles, and/or other steps.

As used herein, any association (or relation, or reflection, or indication, or correspondency, or correlation) involving servers, processors, client computing platforms, players, player accounts, inventories, articles, digital articles, invitations, offers, in-game actions, sets of instructions, operations, determinations, detections, distributions, transfers, transactions, presentations, interfaces, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
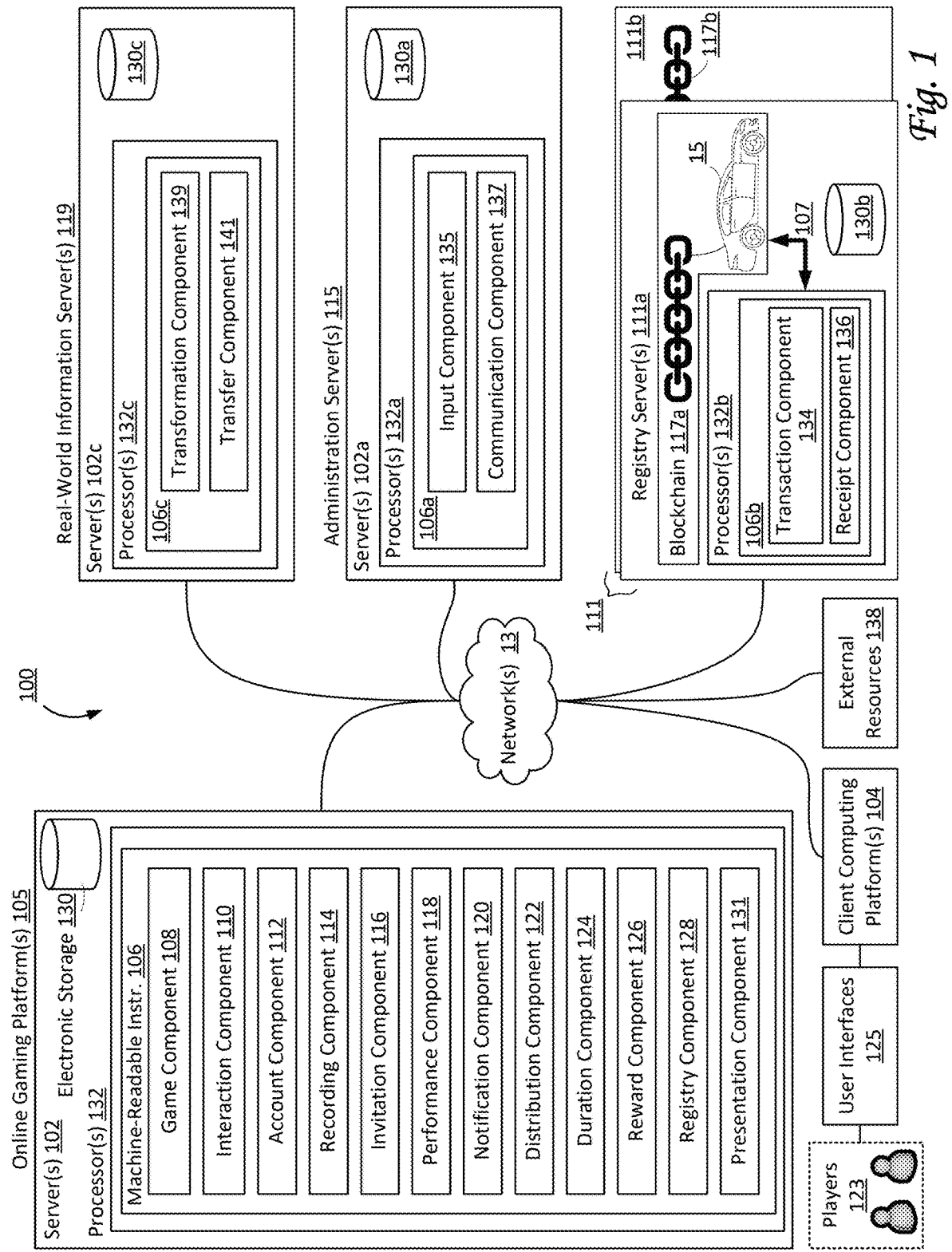
FIG. 1 illustrates a system configured to facilitate temporary ceding of control over unique digital articles for performance of player-specified tasks, in accordance with one or more implementations.

FIG. 1 illustrates a system 100 configured to facilitate temporary ceding of control over unique digital articles for performance of player-specified tasks, in accordance with one or more implementations. By virtue of the systems and methods described in this disclosure, a player who owns a particular unique digital article and its correlated particular in-game player-controllable virtual item (that is usable in instances of games within online gaming platform 105) can temporarily let another player use that particular unique digital article and its correlated particular in-game player-controllable virtual item without relinquishing ownership. In particular, this period of temporary control can be established and/or otherwise defined in advance, and could correspond with (e.g., overlap and/or be limited by) a particular owner-specified task, such as performing in-game activities that benefit the owner. Both players may gain a benefit and/or otherwise obtain an advantage. In some implementations, control may be ceded for some rights and/or some types of usage, while being retained for other rights and/or other types of usage. For example, an owner may retain reporting rights (e.g., the right to receive information regarding activities pertaining to a particular unique digital article, including but not limited to accrued benefits, changes in status or condition, consequences that have occurred, etc.) while temporarily ceding the rights pertaining to in-game usage of the particular unique digital article.

As used herein, the term "unique digital article" may refer to digital articles that are uniquely identified and/or uniquely identifiable, e.g., by an identifier or by identifying information. For example, in some implementations, an identifier or identifying information may include or be based on a combination of different types of information, including but not limited to information regarding the type of a digital article, a serial number and/or other numerical identifier of the digital article, and/or other types of information. As used herein, rights pertaining to unique digital articles may be tracked, recorded, and/or otherwise registered on one or more permanent registries. As such, a unique digital article may be a registry-tracked unique digital article. In some cases, these rights may include ownership. As used herein, a registry is referred to as "permanent" when recorded information is expected to be immutable, and can substantially not be altered or deleted (unless one or more of the fundamental principles underlying these registries is cracked, hacked, broken, and/or otherwise reverse-engineered). By way of non-limiting example, these registries use certain one-way hashing functions that are expected to remain secure (and not reversible, for example).

Individual unique digital articles may be associated and/or correlated with another entity (which may be referred to as a "correlated entity" or a "correlated virtual item") by virtue of technology provided and/or supported by the one or more permanent registries on which usage information (e.g., usage permissions, ownership, and/or other rights) pertaining to the individual unique digital articles is tracked (including but not limited to smart contracts and/or other executable code on the one or more permanent registries). Accordingly, usage information and/or usage permissions pertaining to a unique digital article may correlate to the provision of one or more rights with respect to the correlated entity (e.g., control and/or other accessibility). Transactions involving a unique digital article recorded on a permanent registry may correlate to certain transactions (or modifications) of the correlated entity, and/or vice versa.

In some implementations, correlated entities may be (or include) virtual items configured to be used within online-gaming platform 105 (such as, for example, a player-controllable in-game virtual item or character that is usable within an instance of a game within online gaming platform 105). Other types and/or combinations of correlated entities are envisioned within the scope of this disclosure, including but not limited to physical and/or virtual objects, items, rights, memberships, grants, etc. The use of the singular "entity" or "correlated entity" is not intended to be limiting, as multiple different objects, items, rights, memberships, grants, etc. may be correlated to a single unique digital article. By way of non-limiting example, in some implementations, a correlated entity may be an art work, a ticket to an event, a subscription to certain media content, a bundle of rights related to captured (or generated) audio and/or video information, ownership of or accessibility to distribution gains, and so forth. As used herein, the term "non-fungible token" or "NFT" may be used to refer to a combination of a particular unique digital article and a particular correlated entity that is correlated to the particular unique digital article.

System 100 may include one or more of online gaming platform(s) 105, registry server(s) 111, administration server(s) 115, real-world information server(s) 119, client computing platform(s) 104, user interface(s) 125, server(s) 102, external resource(s) 138, and/or other components. Some implementations use fewer components. Players 123 (also referred to as users) may include one or more of a first player (or owner, or owning player), a second player (or temporary player, or sharing player), a third player, a fourth player, an administrative user, and/or other players. Players 123 may include players who play and/or otherwise interact on online gaming platform 105. As used in descriptions herein, any use of the term "player" may refer to player(s) 123. Electronic storage 130*a*, electronic storage 130*b*, and electronic storage 130*c* may be similar to electronic storage 130 as described elsewhere in this disclosure, though included in administration servers 115, registry servers 111, and real-world information servers 119, respectively, as depicted in FIG. 1.

Instances of games may be executed within one or more online gaming platforms 105. As used herein, online gaming platform(s) 105 may refer to either an individual game (e.g., an interactive online game), a type of gaming console and its ecosystem, and/or both. Online gaming platform 105 may be configured to host (and/or execute instances of) the one or more (online) games. Online gaming platform 105 may be operated, hosted, and/or owned by one or more stakeholders of online gaming platform 105. For example, a platform operator (and/or another stakeholder) may sell in-game virtual items (e.g., characters, weapons, vehicles, mounts, totems, resources, etc.) to players 123 of online gaming platform 105.

Referring to the game and to online gaming platform 105, in some implementations, individual players may own and/or control individual unique digital articles, correlated entities, and/or other virtual items, and exchange these with (or to) other individual players. As used herein, exchanges refer to individual players winning, losing, auctioning, selling, purchasing, trading, bartering, wagering, staking, and/or otherwise exchanging virtual items (e.g., directly, without a centralized store or store interface under control of online gaming platform 105) to other individual players or with other individual players. Due to an exchange, ownership rights of a digital article may transition from an original owner to a new owner (even if there may, in some implementations, be one or more intermediary and/or temporary owners during the process of performing the exchange). In some implementations, unique digital articles may be associated and/or correlated with other rights than ownership rights, such as, by way of non-limiting example, usage permissions and/or distribution rights.

In some implementations, distribution rights of (unique) digital articles may reflect rights held by the individual ones of the players 123 to receive certain distributions of awards (also referred to as benefits) upon exchanges involving the particular digital articles. For example, individual players 123 may own rights related to particular digital articles that guarantee them awards upon (future) exchanges involving those digital articles regardless of whether the individual players 123 own those digital articles (at the time of the particular exchange). In some implementations, the distribution gains may result from a particular action or activity (such as, e.g., a sale of a particular digital article), e.g., within the online gaming platform 105, of a particular digital article. As used herein, a distribution gain resulting from a particular action or activity may include one or more of a portion of the proceeds of the particular action or activity, a fee related to the particular action or activity, a minimum payment triggered by the occurrence of the particular action or activity (or a set of particular actions or activities), and/or another arrangement for payment and/or compensation, including but not limited to combinations of fixed fees, minimum fees, percentages of sales, percentages of profits, and/or other arrangements. The term "portion" does not imply or require a percentage or ratio, but rather is intended to signify that beneficiaries (i.e., the players that hold the distribution rights) may receive something of value and/or use. The distribution gains may include one or more virtual currencies such as virtual tokens, virtual stars, virtual points, virtual real-world currencies (e.g., US Dollars), and/or other gains that are based on the particular digital articles.

In some implementations, (unique) digital articles, correlated entities, and/or other virtual items may include and/or be virtual items that are not fungible and may be usable within online gaming platform 105. In some implementations, these may represent (three-dimensional) in-game player-controllable virtual items or characters that can interact with other (in-game) virtual items (e.g., characters) within online gaming platform 105. In some implementations, virtual items may include one or more of weapons, toys, characters, abilities, skills, tools, pets, clothing, vehicles, mounts, game levels, missions, assignments, chapters, tasks, mini-games, restricted areas within a virtual space, restricted modes of gameplay, access rights within an online game, and/or other virtual items. In some implementations, these virtual items may refer to any item or object within online gaming platform 105 for which a player may use, own, sell, trade, destroy, and/or otherwise effectuate a change of ownership or control.

As used herein, a digital article is fungible if it is functionally and/or physically indistinguishable from another digital article. For example, a payment token such as a Bitcoin is fungible. A digital article may be non-fungible if it is unique, or one-of-a-kind. For example, a specific individual CryptoKitty™ may be non-fungible. A digital article may be semi-fungible if there is a set of a limited number of similar but distinguishable digital articles. For example, a limited-edition BLANKO™ or another in-game virtual item may be semi-fungible. For example, one of a limited number of 2-dimensional or 3-dimensional in-game virtual items may be semi-fungible. In some implementations, a digital ticket to a show, concert, exhibition, and/or other event may be semi-fungible. In some implementations, a piece of art or jewelry (e.g., as a virtual item or as representing a physical item) may be semi-fungible. As used herein, semi-fungible digital articles are considered as unique, "not fungible", or non-fungible digital articles. In some implementations, digital articles may be usable within one or more games.

Registry server(s) 111 (e.g., registry server 111a, registry server 111b, and so forth) may be used to implement one or more permanent registries, including but not limited to blockchain 117a, blockchain 117b (partially visible in FIG. 1), and so forth. In some implementations, one or more permanent registries may be decentralized and/or immutable registries. In some implementations, blockchain 117a and blockchain 117b may be maintained by distributed computing platforms (not shown in FIG. 1). In some implementations, a distributed computing platform may be implemented by a set of client computing platforms and/or servers (including, for example, one or more registry servers 111). The distributed computing platform may support a virtual machine (not shown in FIG. 1). The distributed computing platform and/or the virtual machine may form a runtime environment for smart contracts and/or other executable code. A distributed computing platform may include electronic storage configured to store part or all of blockchain 117a. For example, the smart contracts may be stored on blockchain 117a, blockchain 117b, and/or another permanent registry. In some implementations, the distributed computing platform may be similar to or based on the EOSIO platform. In some implementations, the distributed computing platform may be ETHEREUM. In some implementations, the distributed computing platform may be similar to or based on ETHEREUM. In some implementations, the distributed computing platform may be the POLYGON platform. In some implementations, the distributed computing platform may be similar to or based on the POLYGON platform. In some implementations, the distributed computing platform may be the SOLANA platform. In some implementations, the distributed computing platform may be similar to or based on the SOLANA platform. In some implementations, the virtual machine may be a distributed and/or decentralized virtual machine.

In some implementations, at least one of the permanent registries implemented by registry servers 111 is a private permissioned permanent registry (e.g., a private permissioned blockchain). The private permissioned permanent registry may be configured to record information. The recorded information may include (usage) information pertaining to unique digital articles that are associated and/or correlated with in-game player-controllable virtual items that are configured to be used in an instance of a game. The recorded information may include rights pertaining to the unique digital articles. The recorded information may include metadata that is specific to an individual unique digital article. Implementing in-game actions in the instance of the game may include, for at least some of the in-game actions implemented in the instance of the game, effectuating modifications to the recorded information pertaining to the unique digital article. For example, certain rights or usage permissions may be modified. For example, certain metadata may be modified. In some implementations, a unique digital article may be removed from one permanent registry and added or recorded on another permanent registry. In some implementations, at least one of the permanent registries implemented by registry servers 111 is a public permanent registry (e.g., a public blockchain). The public permanent registry may be configured to be part of either EOSIO mainnet, SOLANA mainnet, ETHEREUM mainnet, ETHEREUM 1.5, ETHEREUM 2.0, a derivative of ETHEREUM 2.0 that is configured to perform transactions of Ether (ETH) between accounts, or a derivative of EOSIO that is configured to perform transactions of EOS between different accounts.

Elements of blockchain 117a or another permanent registry (e.g., transactions, executable code, and/or other information) may be grouped together in units that are referred to as blocks. For example, an individual block may include one or more digital articles (or digital assets) and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more digital articles, one or more transactions, smart contracts, and/or other information.

In some implementations, one or more permanent registries implemented by registry servers 111 may be publicly accessible. In some implementations, one or more permanent registries implemented by registry servers 111 may be private and/or permissioned. In some implementations, one or more permanent registries implemented by registry servers 111 may be append-only (such that existing blocks are immutable once they have been added to the registry). In some implementations, existing blocks of one or more permanent registries implemented by registry servers 111 can substantially not be altered or deleted, unless multiple copies are altered. This is unlikely to happen provided that the multiple copies are stored on different computing platforms, e.g., in different geographical locations. Permanent registries may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, transactions, and/or articles may be digitally signed in a manner that proves integrity and/or prevents tampering, e.g., by providing authentication, as well as non-repudiation.

As depicted in FIG. 1, registry server 111a may include one or more of electronic storage 130b, processor(s) 132b, machine-readable instructions 106b, (node of) blockchain 117a, and/or other components. Machine-readable instructions 106b may include one or more instruction components. The instruction components may include computer program components. The instruction components may include one or more of a transaction component 134, a receipt component 136, and/or other instruction components. In some implementations, an individual registry server may be dedicated to a particular node of a permanent registry. Typically, different nodes are included in (or implemented by, or hosted by) different servers or different computer systems to increase the safety and security of transactions on a blockchain. The consensus protocol used for a particular blockchain will be harder to falsify or circumvent when the different nodes are in different geographical locations, on different types of computing platforms, and/or otherwise distributed and diverse. As depicted in FIG. 1, blockchain 117a may include a unique digital article 15 (by way of non-limiting example, unique digital article 15 may be correlated with a player-controllable in-game virtual item, for example a virtual vehicle as depicted, and various rights pertaining to unique digital article 15 may have been recorded on blockchain 117a, as depicted). Registry server 111b may include similar components as registry server 111a, including but not limited to blockchain 117b and/or other components.

Real-world information server(s) 119 may include one or more of electronic storage 130c, processor(s) 132c, machine-readable instructions 106c, and/or other components. Machine-readable instructions 106c may include one or more instruction components. The instruction components may include computer program components. The instruction components may include one or more of a transformation component 139, a transfer component 141, and/or other instruction components. As used herein, the terms "real world" and "real-world information" refer to the physical world external to system 100 (and external to online gaming platform(s) 105, administration server(s) 115, registry server(s) 111, and real-world information server(s) 119), as well as information obtained therefrom and/or otherwise based thereon. By way of non-limiting example, real-world information may refer to quantifiable and/or deterministic data about events and/or activities that have occurred in the real world. By way of non-limiting example, results from competitions (including sports and e-sports) are real-world information. Weather data, traffic information, stock prices, election results, results of real-world measurements, box office returns, financial market data, and thousands of other types of data are real-world information. In some implementations, an individual real-world information server 119 may be dedicated to a particular type of real-world information (e.g., a particular type of sport, or league, or team, or competition, or tournament, etc.). Real-world information servers 119 may be configured to determine information based on events that have occurred in the real world. This information may be referred to as real-world information. This information may be converted, packaged, and/or otherwise formatted so it can be transferred and used by other components of system 100, particularly by smart contracts recorded on permanent registries. In some implementations, real-world information may include geolocation information pertaining to the events that have occurred in the real world. For example, real-world information for a particular competition may include not only the results of that competition, but also geolocation information regarding the particular competition itself, or one or more competitor(s), and/or other locations that are related to this particular competition. In some cases, a real-world information server 119 may be referred to as an "oracle" or an "oracle server". A particular real-world information server 119 may operate as an immediate-read oracle, a publish-subscribe oracle, a request-response oracle, and/or as a different type of (blockchain) oracle.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Players may access system 100 via client computing platform(s) 104. In some implementations, system 100 and/or registry server(s) 111 may be configured to communicate with one or more of online gaming platform(s) 105, players 123, and/or other entities and/or components, e.g., through one or more networks 13.

Server(s) 102 may include electronic storage 130, processor(s) 132, machine-readable instructions 106, and/or other components. Server(s) 102 may be configured by machine-readable instructions 106. Machine-readable instructions 106 may include one or more instruction components. Instruction components (for any set of machine-readable instructions) may include computer program components. The instruction components may include one or more of a game component 108, an interaction component 110, an account component 112, a recording component 114, an invitation component 116, a performance component 118, a notification component 120, a distribution component 122, a duration component 124, a reward component 126, a registry component 128, a presentation component 131, transaction component 134, receipt component 136, an input component 135, a communication component 137, transformation component 139, transfer component 141, and/or other instruction components. Processor(s) 132*a*, processor(s) 132*b*, and processor(s) 132*c* may be similar to processor(s) 132 as described elsewhere in this disclosure, though included in administration servers 115, registry servers 111, and real-world information servers 119, respectively, as depicted in FIG. 1. Machine-readable instructions 106*a*, machine-readable instructions 106*b*, and machine-readable instructions 106*c* may be similar to machine-readable instructions 106 as described elsewhere in this disclosure, though included in administration servers 115, registry servers 111, and real-world information servers 119, respectively, as depicted in FIG. 1.

Game component 108 is configured to execute, via online gaming platform 105, one or more instances of one or more games. An instance of a game may facilitate presentation of the game to players 123. For example, the instance of the game may be an online game executed with online gaming platform 105. Game component 108 may be configured to implement in-game actions in the instance of the game, e.g., in response to (action) requests for the in-game actions by the players. In some implementations, game component 108 may be arranged, organized, and/or otherwise included in online gaming platform 105. As used herein, the term "game" may refer to one or more games within online gaming platform 105. In some implementations, the game may be provided via a virtual space, and may include a plurality of resource types and/or maps.

The presentation of the game may be based on the views (or view information) of the game that are determined during execution of the game, e.g., as based on instructions and/or other input from players. In some implementations, the view information may be communicated (e.g., by streaming, via object/position data, via game-state transformations, and/or other information) from online gaming platform(s) 105, registry server(s) 111, and/or other sources to client computing platforms 104 for presentation to players 123. In some implementations, online gaming platform(s) 105 may generate, capture, store, and/or otherwise record information regarding the execution of the game such that the view information that has been communicated to particular client computing platforms 104 may be re-created or at least approximated. In some implementations, the particular client computing platforms 104 may generate, capture, store, and/or otherwise record information regarding the execution of the game that is based on the view information that has been communicated to the particular client computing platforms 104, so that this view information may be recreated or at least approximated. The view information determined and transmitted to a given client computing platform 104 may correspond to a location in the virtual space (e.g., the location from which the view is taken, the location the view depicts, and/or other locations), a zoom ratio, a dimensionality of objects, a first person or third person point-of-view, and/or view parameters. In some implementations, one or more view parameters may be selectable by player 123.

The instance of the game may include a simulated space that is accessible by players 123 by clients (e.g., client computing platforms 104) that present the views of the virtual space to a player. The simulated space may have a topography, express ongoing real-time interaction by one or more players 123, and/or include one or more objects positioned within the topography that are capable of locomotion and/or movement within the topography. In some implementations, the topography may be a 2-dimensional topography. In some implementations, the topography may be a 3-dimensional topography. The topography may include dimensions of the simulated space, and/or surface features of a surface or objects that are native to the simulated space. In some implementations, the topography may include a surface (e.g., a ground surface) that runs through at least a substantial section of the simulated space. In some implementations, the topography may describe a volume with one or more bodies positioned therein. The instance executed by the computer components may be synchronous, asynchronous, and/or semi-synchronous.

Within the instance of the game, players 123 may control characters, objects, simulated physical phenomena, and/or other elements within the virtual space to interact with the virtual space and/or each other. The characters may include avatars. As used herein, the term "character" or "player character" may refer to an object or group of objects present in the virtual space, that correspond(s) to an individual player. A particular player character may be controlled by the particular player with which it is associated. Such player characters may be referred to as player-controlled or player-controllable characters. Player-controlled element(s) may move through and interact with the virtual space (e.g., non-player characters in the virtual space, other objects in the virtual space, etc.). In some implementations, player-controlled characters may be capable of locomotion within the topography of the simulated space that is included in the instance of the game. For example, different player-controllable characters may interact in the topography of the simulated space. In some implementations, the topography may include one or more restricted areas that are only accessible under certain conditions. In some implementations, player-controlled elements controlled by and/or associated with a given player may be created and/or customized by the given player. Individual players 123 and/or player accounts may own or control an inventory of virtual goods and currency (e.g., resources of a plurality of resource types) that the individual player can use (e.g., by manipulation of a player character and/or other player-controlled elements) and/or other items, to perform in-game actions within the virtual space. By way of non-limiting illustration, players 123 may include a first player and a second player that interact with online gaming platform 105. The first player and the second player may control digital articles in or through a game hosted by online gaming platform 105. In some implementations, account inventories may be managed (at least in part) using blockchain 117*a*. For example, ownership rights (include usage permissions and/or other types of rights) of individual virtual items included in an individual account inventory may be recorded on blockchain 117*a*. In some implementations, at least some individual virtual items (also referred to as correlated entities) may correlate to individual unique digital articles (these may be tracked by registry servers 111). In some implementations, individual account inventories may correspond to individual smart contracts stored on blockchain 117a.

In some implementations, players may be associated with particular locations in the real world. For example, once a particular player has checked in at a particular location in the real world, the particular player may be associated with that particular real-world location, at least until a newer association is made. In some implementations, associations of players with particular locations may be in (pseudo-) real-time. For example, the current location of the particular client computing platform 104 that is being used to access system 100 and/or online gaming platform 105 may be associated with the particular player. In some implementations, players may be able to associate with a particular real-world location even if this is not their current actual location (e.g., by virtually attending an event that also has a real-world location, such as a concert or professional sports competition). In one or more of the same ways, players may associate their unique digital articles with particular locations in the real world.

Interaction component 110 may be configured to enable, facilitate, and/or implement in-game actions by players 123 in instances of games. Interaction component 110 may be configured to enable, facilitate, and/or implement in-game actions by unique digital articles in instances of games. In some implementations, interaction component 110 may be configured to operate in response to instructions and/or (action) requests by players 123. Interaction component 110 may be configured to receive requests from players 123, e.g., in-game action instructions to perform in-game actions in the instance of the game. By way of non-limiting example, in-game actions may include one or more of performing a move, a dance, a movement, and/or another action within the game, accessing a level or area within the game, using a particular item, weapon, or another resource within the game, participating in a particular game mode (e.g., a Battle Royale mode, or team-versus-team mode), join a particular mission or team, engage in a particular type of exchange and/or challenge between players, and/or other in-game actions. For example, one or more players may interact within online gaming platform 105 to build, create, gather, find, combine, and/or otherwise generate content (i.e., player-generated content). In some implementations, a player request may request access to a particular type or section of a store and/or marketplace within online gaming platform 105.

In some implementations, operations may be accomplished by interaction component 110 through user interfaces 125 (also referred to as player interfaces 125). In particular, operations pertaining to a particular player may be accomplished or controlled or initiated through a particular user interface 125 of a particular client computing platform 104, where the particular client computing platform 104 is associated with the particular player. In other words, the particular player may interact with an instance of a game through interaction component 110 and/or the particular user interface 125. In some implementations, operations by interaction component 110 may be limited, restricted, and/or otherwise controlled by other components of system 100. In some implementations, interaction component 110 may require acceptance from particular players (e.g., to perform certain operations). For example, an acceptance may be required to accept a particular offer to partake in an activity or agreement. In some implementations, interaction component 110 may be configured to receive indications of acceptances and/or other agreements from players.

In some implementations, interaction component 110 may be configured to facilitate interaction of players 123 with system 100. In some implementations, interaction component 110 may be configured to facilitate interaction by players 123 through user interfaces 125. For example, a particular player may be associated with a particular client computing platform 104, which may include a particular user interface 125. In other words, an individual player interface 125 may be player-specific and/or specific to a particular client computing platform 104. In some implementations, interaction component 110 may facilitate entry and/or selection through (presentation of) one or more user interfaces 125 (such as, by way of non-limiting example, any of the interfaces described in this disclosure). In some implementations, interaction component 110 may be configured to facilitate an in-game action by a particular unique digital article under control of a temporary player (as opposed to the owning player), in particular, during an attempt to perform an owner-specified task. The player itself may not be temporary, but the ability to control and use the particular unique digital article is temporary. In some cases, a temporary player may be referred to as a temporary owner (as opposed to the permanent owner or long-term owner).

Account component 112 is configured to manage player accounts. Player accounts may be associated with players 123. Player accounts may include and/or be associated with account inventories of virtual items. For example, the player accounts may include a first player account associated with a first player (or an owner account associated with the owner), a second player account associated with a second player, and so forth. For example, the first player account may include a first account inventory of one or more virtual items, the second player account may include a second account inventory of one or more virtual items and so forth. Individual players may own and/or control one or more virtual items in their individual account inventories. In some implementations, the first account inventory includes one or more unique digital articles (e.g., a first unique digital article, other unique digital articles, etc.). In some implementations, the second account inventory includes one or more unique digital articles (e.g., a second unique digital article, other unique digital articles, etc.). The first unique digital article may be correlated with a first in-game player-controllable virtual item configured to be used (e.g., played with) in the instance of the game (e.g., during in-game activities). The second unique digital article may be correlated with a second in-game player-controllable virtual item configured to be used (e.g., played with) in the instance of the game, and so forth. In some implementations, virtual items (e.g., unique digital articles) may be associated with location information (e.g., location within the simulated space of an instance of a game, or a real-world location). In some implementations, management of player accounts may be accomplished at least in part through (individual) cryptographic wallets. For example, a first player account may be associated with a first cryptographic wallet, and so on.

Recording component 114 is configured to record information, assets, and/or (unique) digital articles on permanent registries. In some implementations, the information may include executable code, such as, e.g., smart contracts. In some implementations, recording component 114 may record and/or modify usage information (e.g., usage permissions, other rights, and/or metadata) pertaining to articles. In some implementations, recording component 114 may be configured to receive (recordation) requests to perform a recordation (e.g., of a unique digital article or a smart contract on a permanent registry). For example, recording component 114 may receive, from a first player, a recordation request to record and/or modify usage information pertaining to a first unique digital article on a first permanent registry (such as, e.g., blockchain 117a). In some implementations, recording component 114 may receive such requests from online gaming platform 105 and/or other components of system 100. For example, a particular request to record (rights pertaining to) a particular unique digital article may correspond to the issuance and/or creation of that particular unique digital article. When a unique digital article or other digital article is issued and/or created, recording component 114 may record its ownership on a particular permanent registry. In some implementations, a particular request to modify rights (e.g., usage permissions) pertaining to a particular unique digital article may correspond to an exchange of that particular unique digital article (e.g., between two players). In some implementations, a particular request to modify rights (e.g., usage permissions) pertaining to a particular unique digital article may correspond to an agreement between two players to temporarily allow a particular player to use that particular unique digital article (e.g., for the performance of player-specified tasks).

In some implementations, recording component 114 may be configured to record executable code on a particular permanent registry, such as, e.g., blockchain 117a. In some implementations, particular executable code may be a particular smart contract. The particular smart contract may interact with one or more real-world information servers 119. The particular smart contract may be configured to receive real-world information from one or more real-world information servers 119. The particular smart contract may be configured to perform one or more evaluations based on the received real-world information. In some implementations, smart contracts may be configured such that one or more evaluations are based, at least in part, on geolocation information associated with players or unique digital articles. In some implementations, the one or more evaluations may evaluate one or more consequences (e.g., in-game consequences). For example, a first evaluation may evaluate whether to provide a first distribution (such as distributing an award to a player or to a unique digital article) or to seize a first stake. For example, a second evaluation may evaluate whether to provide a second distribution (such as distributing a second award to a player or to a second unique digital article) or to seize a second stake, and so forth.

Invitation component 116 may be configured to effectuate presentations of user interfaces to players. Invitation component 116 may be configured to present user interfaces to players. In some implementations, a particular user interface may be configured to obtain entry of user input from a player. For example, the user input from a particular owner (of a particular unique digital article) may include input to define and/or select one or more particular task parameters that define a particular task and a particular objective of the particular task. A player-specified task is a task define by a player (i.e., the player provided and/or selected at least some of the task parameters). A task may include one or more in-game actions that can be performed in an instance of a game on online gaming platform 105. An objective (or a task objective) may represent an outcome for completion of a task. For example, this outcome may be the desired outcome, the expected outcome, the preferred outcome, and/or otherwise a potential outcome of an attempt to perform the task. By way of non-limiting example, a task may be to find and gather diamonds in a particular game (or gold-pressed latinum, dilithium crystals, unobtainium, etc.). The objective of this task may be to increase the inventory of a particular user (e.g., the owner) with some amount of these diamonds. The owner of a virtual item in the game that is useful to find and gather diamonds (e.g., a certain type of pick-axe, or drill, or mining rig) may temporarily cede control of this virtual item to a different player (i.e., a second player) for the task of finding and gathering diamonds. Let's say the objective of this task is to increase the owner's supply of diamonds by an amount of diamonds equivalent to $1000. The second player attempts to perform and/or complete this task. Let's say the second player succeeds. Upon completion of the task, control over the virtual item is reverted back to the owner, and the diamonds are provided to the owner. In some cases, the second player may earn some reward for completing this task. The reward may be conditional on the actual outcome of the attempt to perform this task. For example, the second player may earn $10 for attempting and $100 for completing the task.

In some implementations, the task parameters may define and/or specify when a task starts or ends. For example, a task parameter may represent a deadline for the completion of a task. In some implementations, the task parameters may define and/or specify one or more conditions that mark the end of the attempt to perform the task (e.g., an attempt may end before a task has been completed). In some implementations, the task parameters may define and/or specify one or more conditions that mark the end of a period of ceding control over a particular unique digital article. In some implementations, task parameters may define and/or specify one or more rewards related to a particular task. In some implementations, actual rewards may be based on the actual outcome or result of an attempt to perform a particular task. For example, an actual reward may be greater if a task is completed, compared to a smaller reward for a failed attempt. In some cases, rewards may be tiered and tied to ranges of outcomes for an attempt to perform a task (e.g., this may provide a bonus structure that incentivizes a temporary player to perform a task to the best of their abilities). In some implementations, one or more of the rewards may be a portion of the earnings resulting from the attempt to perform a task. For example, the resulting diamonds may be split between the owner and the second player. In some implementations, performing a task may require in-game actions that any properly-equipped player could perform. However, the owner of a particular unique digital article may prefer that another player performs this work instead. See, by way of non-limiting example, FIG. 3. The user input from a particular owner (of a particular unique digital article) may include input to select a particular unique digital article (e.g., a souped-up virtual vehicle, or a helpful tool to accomplish some task in the game). In some implementations, the user input from a particular owner may initiate transmission of particular information to one or more players. The particular information may represent an invitation for the one or more players (e.g., the temporary player) to temporarily gain control over the particular unique digital article during an attempt to perform the owner-specified task(s).

Registry component 128 may be configured to generate sets of instructions for registry servers 111 (e.g., registry server 111a) and/or one or more permanent registries (e.g., blockchain 117a). In some implementations, registry component 128 may be configured to transfer the generated sets of instructions to registry servers 111 and/or one or more permanent registries. In some implementations, one or more of these instructions may instruct the formation of a smart contract and/or the recording of the smart contract on the one or more permanent registries (e.g., blockchain 117a). In some implementations, one or more of these instructions may call and/or otherwise invoke a method or function of a smart contract on the one or more permanent registries (e.g., blockchain 117*a*). In some implementations, these instructions may instruct registry servers 111 to record and/or modify unique digital articles, transactions, and/or rights on one or more permanent registries. In some implementations, these instructions may instruct registry servers 111 to record and/or modify sets of usage information (e.g., usage permissions, ownership rights, etc.) pertaining to unique digital articles. In particular, some types of modifications (e.g., to cede control over a particular unique digital article) may be temporary. For example, a temporary player may temporarily have usage permissions to use a particular unique digital article, until the usage permissions revert back to the owner of the particular unique digital article. In some implementations, the modification of usage permissions for a particular unique digital article may be made so that the temporary player cannot sell the particular unique digital article. Alternatively, and/or simultaneously, in some implementations, the modification of usage permissions for a particular unique digital article may be made so that the owner cannot sell the particular unique digital article during the period of temporary ceding of control over the particular unique digital article. For example, ownership of the particular unique digital article may be controlled by a multi-signature scheme (e.g., a 2-of-3 multi-signature), with the owner, the temporary player, and an independent third party each controlling one signature. In some implementations, by virtue of the modification, the particular unique digital article may be temporarily transferred to the cryptographic wallet of the temporary player. In some implementations, responsive to the modification, the particular unique digital article may be temporarily transferred to the cryptographic wallet of the temporary player.

In some implementations, a unique digital article may be based on the Ethereum Request for Comment (ERC)-721 standard (or an equivalent standard for non-Ethereum-based blockchains). In some implementations, a unique digital article may be based on the Ethereum Request for Comment (ERC)-1155 standard (or an equivalent standard for non-Ethereum-based blockchains). In some implementations, a unique digital article may be based on a standard that is a superset of the ERC-721 standard or of the ERC-1155 standard that provides at least the same functions and/or methods as those respective standards. In some implementations, a temporary player may be referred to as an approver (or temporary approver) as described in, for example, the ERC-721 standard.

In some implementations, registry component 128 may transfer a particular set of instructions that, upon execution by blockchain 117*a*, issue a new unique digital article to a particular player or particular account (i.e., record the rights and/or other usage information pertaining to the new unique digital article, including it being owned by the particular player or the particular account). Individual unique digital articles may be associated with individual sets of usage information, including but not limited to usage permissions or ownership rights. For example, registry component 128 may transfer a particular set of instructions that, upon execution by blockchain 117*a* and blockchain 117*b*, remove a particular unique digital article from blockchain 117*a* and add the particular unique digital article to blockchain 117*b*. For example, registry component 128 may transfer a particular set of instructions that, upon execution by blockchain 117*a* and blockchain 117*b*, analyze whether a particular player owns one or more particular unique digital articles.

In some implementations, a particular set of instructions may modify the usage information for a particular unique digital article, to add, modify, or remove metadata specific to the particular unique digital article. For example, certain instructions may record a modification of particular metadata. For example, metadata may include an identifier, a reference, a link, a Uniform Resource Locator (URL), and/or other information that refers to a particular location of stored information, or to the stored information itself. In some implementations, generation and/or transfer of one or more sets of instructions by registry component 128 may occur responsive to receipt of particular player input and/or instructions from a particular player through player interface 125. In some implementations, the recorded metadata for a particular unique digital article may include information (e.g., a checksum value, a hash value, a digital signature, a fingerprint, etc.) that proves the authenticity and/or integrity of the information that refers to the particular location of particular stored information, or of the particular stored information itself. In some implementations, registry component 128 may be configured to execute sets of instructions, including but not limited to sets of instructions generated by registry component 128.

In some implementations, registry component 128 may be configured to (automatically) revert the control over a particular unique digital article from a particular temporary player back to the owner of the particular unique digital article. In some implementations, registry component 128 may be configured to revert previously-made modifications to a particular set of usage permissions, such that the owner gains back control over a particular unique digital article. In particular, upon modification of the pertinent usage permissions, the control of the usage of the particular unique digital article is no longer ceded to the particular temporary player, and instead the owner again has the control of the usage of the particular unique digital article. In other words, the particular temporary player loses control over the particular unique digital article as the owner gains this control. In some implementations, modifications of usage permissions may be accomplished through function calls of an Application Programming Interface (API) for one or more smart contracts used to control and/or otherwise manage particular unique digital articles (by way of non-limiting example, through API 107). In some implementations, control of the usage of particular unique digital articles may be performed through multi-signature smart contracts. In some implementations, operations by registry component 128 may be responsive to detections by duration component 124 and/or other components of system 100.

Duration component 124 may be configured to detect conditions that mark an end of an attempt to perform a particular task. For example, duration component 124 may detect and/or determine the end of a particular period. For example, duration component 124 may detect the completion of a particular task. For example, duration component 124 may detect the occurrence and/or passage of a defined end-time of a particular task. In some implementations, information used by duration component 124 may be obtained from real-world information server 119. In some cases, detections by duration component 124 may be based on real-world time (e.g., a specified date and time). In some cases, detections by duration component 124 may be relative to a specified real-world time (e.g., 1 hour after the end of a real-world professional sports competition). Detections and/or determinations by duration component 124 may serve to trigger and/or otherwise initiate action from one or more other components of system 100, including but not limited to registry component 128. In some implementations, duration component 124 may be configured to monitor statuses (including but not limited to completion) of player-specified tasks in instances of games within online gaming platform 105.

Reward component 126 may be configured to determine whether unique digital articles, other digital articles, accounts, and/or players 123 should receive one or more of rewards, access to in-game content, access to game-specific communication channels, certificates, awards, prizes, earnings, and/or virtual items. Rewards may be related to tasks, particularly player-specified tasks. In some implementations, rewards may be conditioned upon results obtained by a temporary player during an attempt to perform a particular task. In some implementations, reward component 126 may be configured to determine and/or confirm whether particular in-game player-controllable virtual items participated in particular in-game events. As used herein, the term "event" (particularly, in-game event) may refer to in-game competitions, battles, races, hunts, searches, parties, concerts, celebrations, protests, stunts, feats, and/or other actions, especially noteworthy ones. In some implementations, participation in an in-game event implies an accomplishment in the game, such as winning a competition, defeating an opponent in battle, beating an opponent in a race, succeeding in a hunt or search, attending a party or concert or celebration or protest, and/or other accomplishments (that may make an event noteworthy). In some implementations, an in-game event may be defined as a particular result of a particular in-game action. In some implementations, these types of determinations may be based on and/or responsive to actions by other components of system 100, including but not limited to registry-analysis component 120. As used herein, the term "reward" may represent anything of value or use in system 100, or online gaming platform 105, or registry servers 111, or anything that can be exchanged or otherwise traded for something of such value or use, whether tangible or not, whether physical and/or virtual. In some implementations, online gaming platform 105 may determine a particular player is eligible to receive one or more rewards. Distributions of rewards may be made by distribution component 122. In some implementations, reward component 126 may be configured to define and/or otherwise determine how earnings resulting from a performance in a particular task are divided between, e.g., an owner and a temporary player.

Performance component 118 may be configured to permit and/or perform requested in-game actions, e.g., to use particular unique digital articles. In some implementations, performance by performance component 118 may require not only a particular type of request, but additionally may require the pertinent unique digital article (or other digital article that is not fungible) currently be recorded on a particular permanent registry (or on a particular type of permanent registry). In some implementations, actions by performance component 118 may be performed responsive to particular actions or results from other components of system 100.

Notification component 120 may be configured to notify players. For example, notification component 120 may notify players 123 in response to tasks, events, rewards, distributions, in-game action instructions, consequences, modifications of usage permissions, and/or other activities in system 100. In some implementations, a player may be notified responsive to a requested in-game action (as requested through an in-game action instruction) not being permitted or not being performed. In some implementations, actions by notification component 120 may be performed responsive to particular actions, results, determinations, evaluations, consequences, and/or decisions from other components of system 100. For example, notification component 120 may respond to a particular in-game action instruction (by a particular player, and pertaining to a particular unique digital article) with a particular response such that, responsive to a particular determination, the particular response notifies the particular player accordingly. For example, notification component 120 may notify the owner of a particular unique digital article regarding the results of a specific task during which the particular unique digital article is being controlled and used by a temporary player.

Distribution component 122 may be configured to distribute and/or otherwise provide one or more of awards, access to in-game content, access to game-specific communication channels, certificates, rewards, prizes, distribution gains, and/or virtual items to players 123. For example, one or more rewards may be related to the performance of one or more player-specified tasks. In some implementations, distribution component 122 may be configured to effectuate consequences (e.g., in-game consequences), including positive consequences and negative consequences for unique digital articles. For example, for a positive consequence, distribution component 122 may provide a particular distribution of a particular award to a particular unique digital article or player, such that the pertinent account inventory is increased by the particular award. For example, for a negative consequence, distribution component 122 may seize a stake, so a particular player no longer controls or owns this stake. Operations by distribution component 122 may be based at least in part on operations by other components of system 100, including but not limited to reward component 126.

Presentation component 131 may be configured to present interfaces (e.g., user interfaces 125, also referred to as player interfaces 125) to players, e.g., through client computing platforms 104 associated with the respective players. In some implementations, presentation component 131 may be configured to effectuate presentations of interfaces to players 123. For example, presentation component 131 may present an invitation (from invitation component 116) to one or more players that are invited to temporarily gain control over a particular unique digital article, for one or more player-specified tasks. In some implementations, presentations by presentation component 131 may be performed jointly (or at least in some cooperative manner) with one or both of game component 108 and/or interaction component 110. In some implementations, presentation component 131 may present, on a particular client computing platform 104, a particular player interface 125 to a particular player. Particular player interface 125 may be configured to receive player input from the particular player, including but not limited to an indication whether an invitation has been accepted. Particular player interface 125 may enable, through the received player input, the particular player to perform particular actions and/or activities (in system 100). By virtue of the received player input, these actions and/or activities may be referred to as player-initiated.

Receipt component 136 may be configured to receive (sets of) instructions to add, modify, analyze, and/or remove recorded information (e.g., usage information such as usage permissions) in blockchain 117a. In some implementations, receipt component 136 may receive and/or execute instructions to record modifications of metadata on particular permanent registries. For example, receipt component 136 may receive one or more sets of instructions from registry component 128, online gaming platform 105, and/or other components of system 100. Receipt component 136 may provide received sets of instructions to record component 134 for execution. In some implementations, execution of individual ones of the instructions received may include invoking one or more function calls of an Application Programming Interface (API) 107. For example, API 107 may be configured to provide interactive communication between blockchain 117a and other components of system 100. For example, in some implementations, API 107 may support methods or functions that are implemented as function calls to smart contracts stored on blockchain 117a. For example, in some implementations, API 107 may support methods or functions that analyze whether a particular player owns one or more particular unique digital articles, one or more particular types of unique digital articles, and/or a particular collection of multiple unique digital articles. For example, in some implementations, API 107 may support methods or functions that analyze the status of a particular (type of) unique digital article. In some implementations, receipt component 136 may be arranged, organized, and/or otherwise included in registry server 111 and/or blockchain 117a.

Transaction component 134 may be configured to record information, including but not limited to (ownership) rights pertaining to digital articles, e.g., on one or more permanent registries, such as blockchain 117a. In some implementations, transaction component 134 may record information on electronic storage 130b. In some implementations, transaction component 134 may record and/or modify information on blockchain 117a. The information may include ownership rights, usage permissions, and/or other information. For example, particular recorded information may reflect rights pertaining to a particular digital article by a particular player or group of players. For example, a particular unique digital article may be correlated with a three-dimensional in-game player-controllable item or character that can interact with other virtual items within online gaming platform 105. For example, transaction component 134 may execute instructions to record modifications on particular permanent registries. Recorded information may be specific to a digital article (i.e., article-specific). For example, distribution rights for a particular digital article may designate rights to certain distributions of awards upon a specifically defined in-game action (e.g., an exchange between players) involving the particular digital article. In some implementations, modifications of metadata may add, remove, and/or modify a URL and/or other information that refers to a particular location of stored information.

In some implementations, transaction component 134 may be configured to record information in blockchain 117a. In some implementations, transaction component 134 may add, modify, analyze, and/or remove recorded information. For example, in accordance with received instructions from receipt component 136, transaction component 134 may transfer rights pertaining to a particular digital article from a first owner to a second owner (e.g., from an original owner to a new owner, or from a loser of a challenge to a winner of the challenge) such that the recorded information on blockchain 117a no longer reflect the rights pertaining to the particular digital article as owned by the first player. In some implementations, in accordance with received instructions, transaction component 134 may transfer rights pertaining to a particular digital article temporarily, e.g., from a first owner to a temporary second owner. In some case, a transfer of ownership may temporarily use a holding account that is merely used until ownership is transferred to either the original owner or a new owner. As used herein, the term "temporary" (and derivatives thereof) refers to a transfer or to ownership that is either known to be changed and/or modified within a predetermined period, or expected to be changed and/or modified within a predetermined period. Conversely, a non-temporary transfer from a first owner to a second owner (e.g., due to a particular exchange) can conceivably be changed and/or reverted (back from the second owner to the first owner) due to a separate and new exchange that is independent of the first particular exchange. In some implementations, in accordance with received instructions, transaction component 134 may transfer rights pertaining to a particular digital article non-temporarily from a first owner to a second owner, e.g., when a particular exchange is not reversible or no longer reversible. In some implementations, transaction component 134 may be arranged, organized, and/or otherwise included in blockchain 117a.

In some implementations, transaction component 134 may be configured to obtain article-specific information (e.g., metadata, usage information, ownership rights, distribution rights, and/or other information) for particular digital articles. In some implementations, transaction component 134 may be configured to access blockchain 117a to obtain or modify the article-specific information (that are recorded on blockchain 117a, e.g., in one or more smart contracts).

Input component 135 may be configured to receive user input from administrative users. For example, the user input may include entry and/or selection of particular information, unique digital articles, types of digital articles, virtual items, types of virtual items, types of characters, and/or any entity or object that interacts with any part of system 100 and/or plays a part in the operation of system 100. For example, an administrative user may select a particular set of unique digital articles (e.g., all "CAMO BLANKOS" that have been issued, or all BLANKOS at a particular event) as the input set of unique digital articles for other components of system 100. As an example, the administrative user may select a set of unique digital articles (e.g., all "BOSS DINO BLANKOS" that have been issued) as the input set of unique digital articles for other components of system 100.

Communication component 137 may be configured to facilitate communication and/or interaction between administration server 115 and the rest of system 100. For example, communication component 137 may communicate user input received from administrative users by input component 135 to other components of system 100, particularly online gaming platform 105.

Transformation component 139 may be configured to determine information. In some implementations, transformation component 139 may determine real-world information based on events that have occurred in the real world (e.g., based on event information regarding the events that are occurring and/or have occurred in the real world). In some implementations, real-world information (and/or the events they are based on) may be deterministic. In some implementations, real-world information (and/or the events they are based on) may be quantifiable. In some implementations, real-world information (and/or the events they are based on) may be measurable. In some implementations, transformation component 139 may be configured to receive the event information regarding the events that are occurring and/or have occurred in the real world, and the determined information may be based on this received event-information. Transformation component 139 may transform information about the real world into real-world information for use by other components of system 100. In some implementations, transformation component 139 may be part of real-world information server 119.

Transfer component 141 may be configured to transfer information to other components of system 100, including but not limited to registry server 111 and/or a permanent registry. The transferred information may be determined by another component of system 100, including but not limited to transformation component 139. In some implementations, transfer component 141 may be configured to transfer a combination of real-world information and geolocation information to registry server 111 and/or a permanent registry. In some implementations, transfer component 141 may be part of real-world information server 119.

Figure 3:
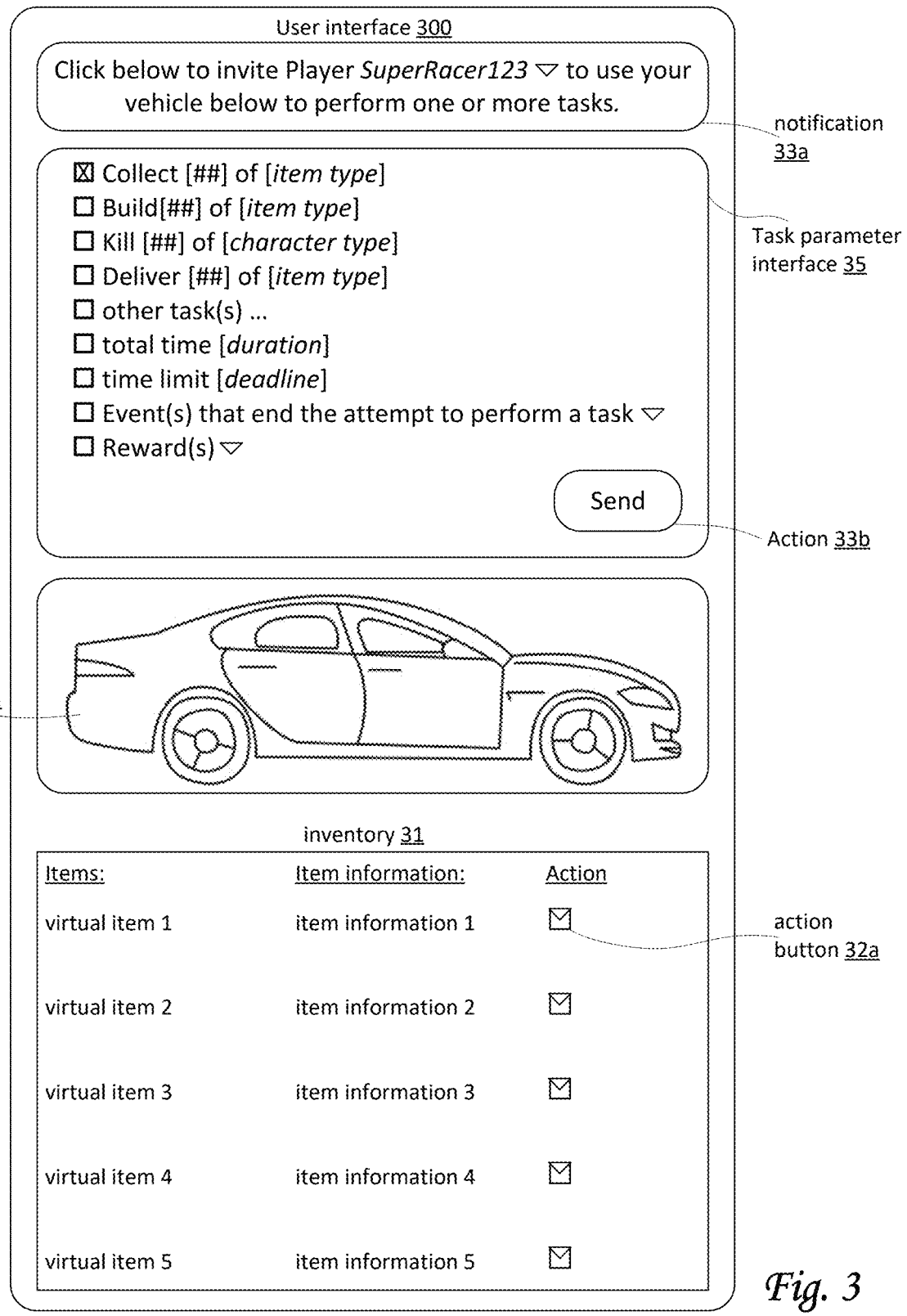
FIG. 3 illustrates an example implementation of a player interface, as may be used by a system configured to facilitate temporary ceding of control over unique digital articles for performance of player-specified tasks, in accordance with one or more implementations.

FIG. 3 illustrates an example implementation of a user interface 300 as may be used by a system similar to or the same as system 100, in accordance with one or more implementations. User interface 300 may enable a particular player (say, "Alice", not depicted) to view and/or use an account inventory and/or one or more unique digital articles controlled by the particular player. User interface 300 may include a section or field for account inventory 31, and/or other graphical player interface elements. As depicted, account inventory 31 may include a list of different virtual items and/or articles currently controlled by Alice, including virtual items 1-2-3-4-5. Account inventory 31 further depicts item information regarding these virtual items, as indicated by item information 1-2-3-4-5, which correspond to virtual items 1-2-3-4-5, respectively. Account inventory 31 as depicted may further include graphical user interface elements such as, by way of non-limiting example, an action button 32a (which may initiate an in-game action instruction), and/or other graphical user interface elements. Upon engagement by Alice, in-game action instruction button 32a may request "virtual item 1" to be used/selected for a particular request (e.g., through a text field or a dropdown menu, as indicated by a triangle in a box). For example, Alice may request to view and/or otherwise use unique digital article 15a (here, correlated to an in-game vehicle, as depicted). User interface 300 as depicted may further include graphical user interface elements such as, by way of non-limiting example, a notification element 33a, and/or other graphical user interface elements. Notification element 33a notifies the particular player regarding selected unique digital article 15: "Click below to invite Player "SuperRacer123" to use your vehicle below to perform one or more tasks" Presumably the proposed and/or prospective temporary player has previously been selected by Alice. The triangle after the player's identifier represents a dropdown menu to select other players. Clicking on action button 33b may initiate the transmission of an invitation to player "SuperRacer123" regarding one or more specific tasks as defined through the task parameter interface 35. The task parameters in task parameter interface 35 include available selections for collecting, building, killing, and delivering, by way of non-limiting example. Other task parameters in task parameter interface 35 include available selections related to the duration or deadline for a particular task. Other task parameters in task parameter interface 35 include available selections related to one or more rewards for a particular task. The triangles in task parameter interface 35 represent menus for additional options related to the pertinent task(s).

Figure 5A:
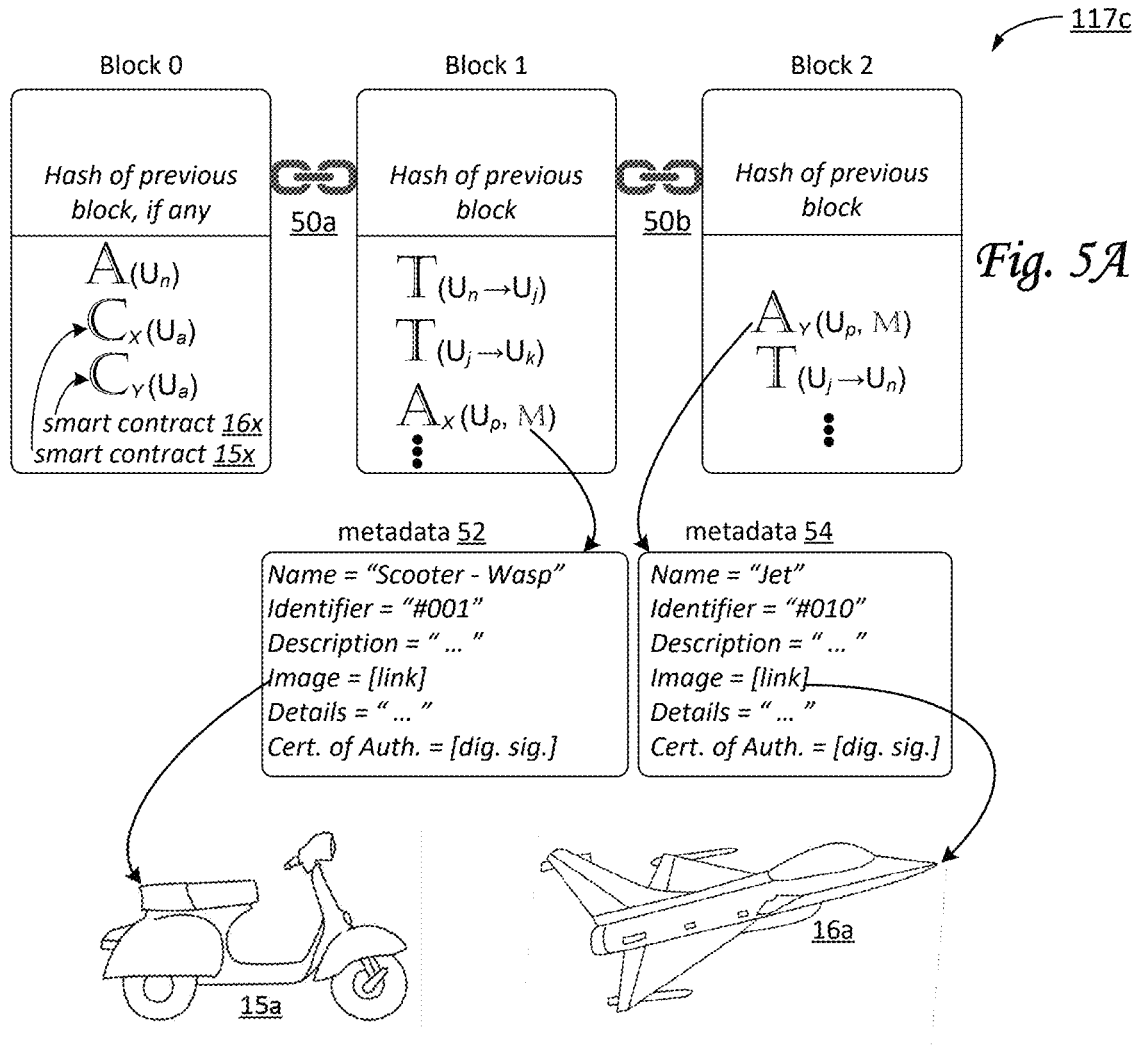
FIGS. 5A-5B illustrate exemplary permanent registries, as may be used by a system configured to facilitate temporary ceding of control over unique digital articles for performance of player-specified tasks, in accordance with one or more implementations.

FIG. 5A illustrate exemplary blockchain 117c as may be used by system 100, in accordance with one or more implementations. FIG. 5A illustrates a blockchain 117c that includes a block 0, a block 1, and a block 2. As time progresses, more blocks may be added to blockchain 117c. The blocks within blockchain 117c are ordered. In block 0, one article (indicated by a capital "A") is generated and/or assigned to player "n" ($U_n$). A second digital article, a smart contract 15x is assigned to player "a" ($U_a$), and a third digital article, a smart contract 16x, is assigned to player "a" ($U_a$), which may be an administrative user. For example, smart contract 15x and smart contract 16x may be or include templates for issuing particular types of unique digital articles. Smart contract 15x and smart contract 16x may have been posted to blockchain 117c by a component similar to record component 134.

For example, the articles in block 0 may include individual ownership rights recorded for particular digital articles within an online gaming platform, similar to or the same as online game platform 105. Block 1 is connected to block 0 (as indicated by a link 50a), for example by including an address of block 1 in block 0, or vice versa. Likewise, block 1 is connected to block 2, as indicated by a link 50b. In block 1, a transaction to smart contract 15x (indicated by "Ax") is recorded. Transaction Ax to smart contract 15x may issue a unique digital article to player "p", the unique digital article being defined by metadata 52. Here, metadata 52 is correlated to a player-controllable virtual item referred to as "Scooter-Wasp", having identifier "#001", as depicted by a linked image of unique digital article 15a, as well as including various other fields of information, including a digital signature that serves as a certificate of authenticity. In block 1, another transactions from player "n" to player "j", and from player "j" to player "k" are also recorded. In block 2, several transactions may be recorded: a transaction from player "j" to player "n", and a transaction to smart contract 16x (indicated by "$A_Y$") is recorded. Transaction $A_Y$ to smart contract 16x may issue a unique digital article to player "p", the unique digital article being defined by metadata 54 (here, correlated to a player-controllable virtual item referred to as "Jet", having identifier "#010", as depicted by a linked image of unique digital article 16a, as well as including various other fields of information. In block 2, another transaction is recorded, from player "j" to player "n".

Figure 5B:
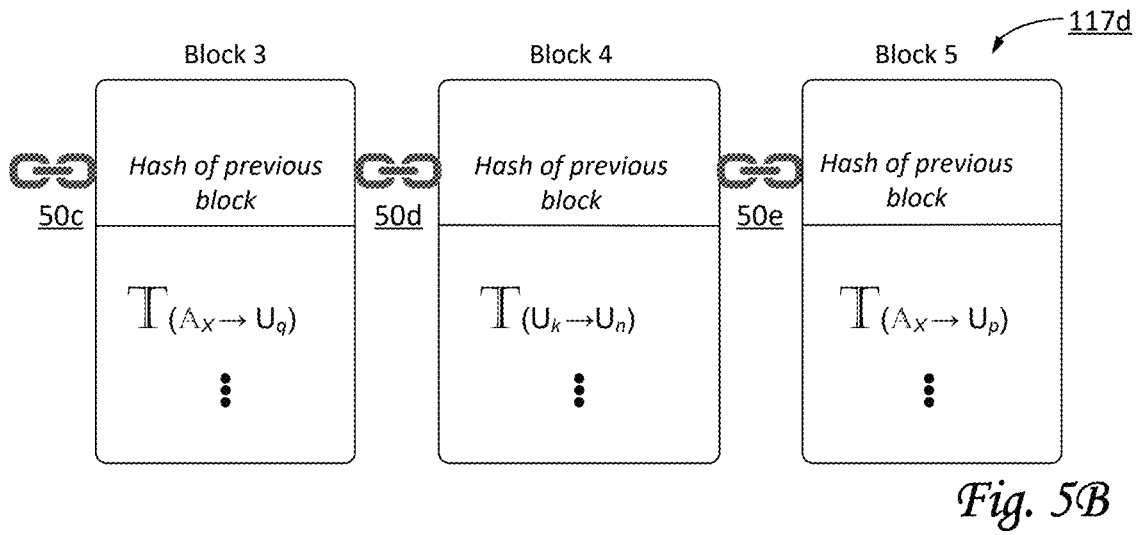

By way of non-limiting example, FIG. 5B illustrates a blockchain 117d that includes several blocks (block 3, block 4, block 5), that have been appended to blockchain 117c. Block 3 may be connected to block 2 (as indicated by link 50c), block 4 may be connected to block 3 (as indicated by a link 50d), and block 5 may be connected to block 4 (as indicated by a link 50e). In block 3, another transaction may be recorded that modifies particular rights (i.e., usage permissions) pertaining to the unique digital article (indicated by "Ax" and defined by metadata 52) such that player "q" can temporarily use this "Scooter-Wasp" in a specific task. Block 4 includes a transaction (indicated by a capital "T") from player "k" to player "n". For example, the transaction may represent a purchase of a first virtual item by player "n" from seller player "k". Block 5 includes a transaction from smart contract 15x to player "p", which may represent the automatic reverting of all temporarily ceded rights back to player "p".

Figure 4A:
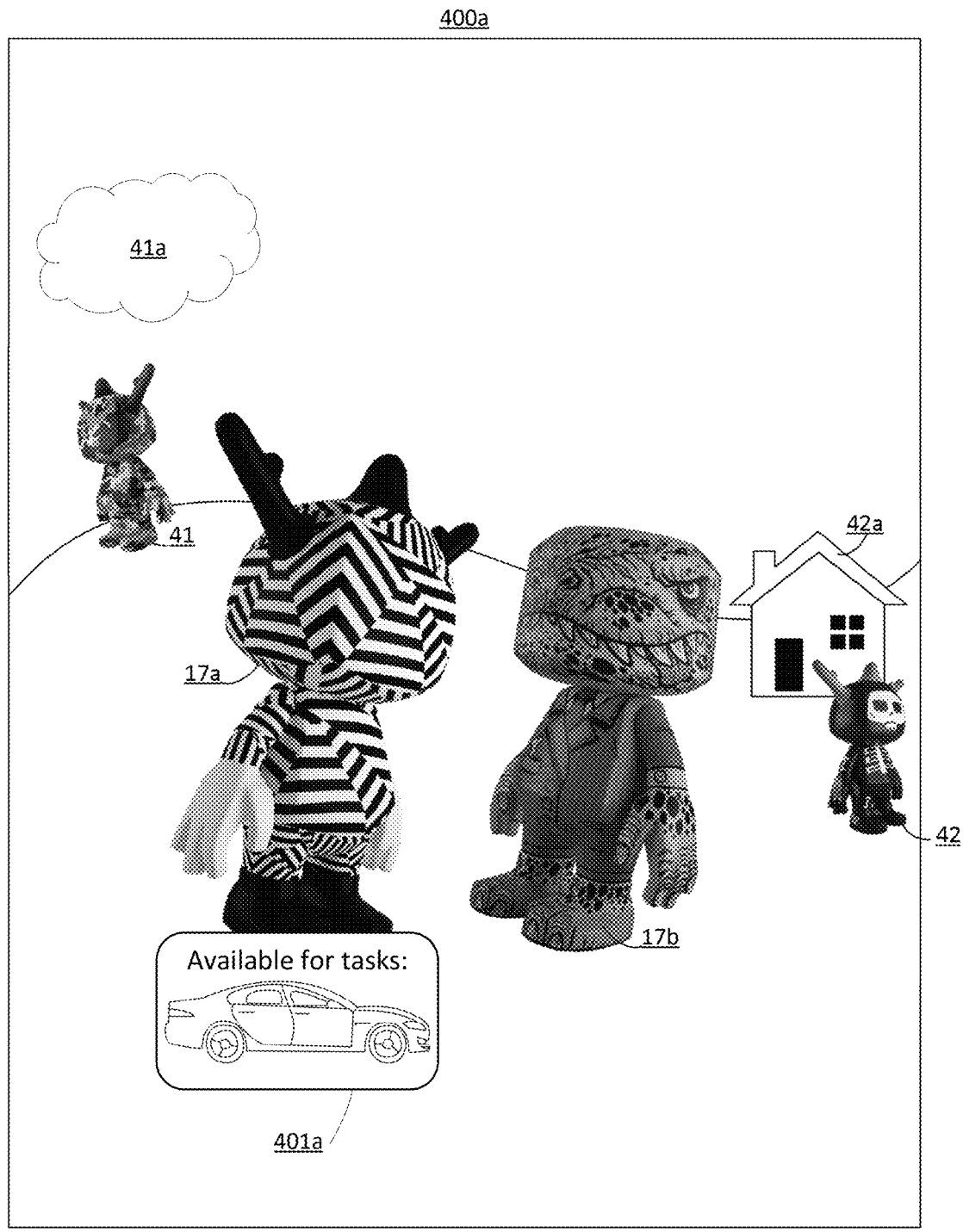
FIGS. 4A-4B illustrate an exemplary views of interactive gameplay in an instance of a game, as may be used by a system configured to facilitate temporary ceding of control over unique digital articles for performance of player-specified tasks, in accordance with one or more implementations.

By way of non-limiting example, FIG. 4A depicts a view 400a of interactive gameplay by a particular player (say, "Alice", not depicted), using unique digital article 17a (depicted as a particular in-game player-controllable character, also referred to as "DAZZLE BLANKO"). Other players may be active and present in view 400a (depicting a topography of a simulated space included in the instance of a game), for example through a first player-controllable character 41 (standing below a cloud 41a), a second player-controllable character 42 (standing near an in-game structure 42a that looks like a house), and a character 17b (here, a "BOSS DINO BLANKO", which may be owned by a prospective temporary player, say "Bob"). Alice (or any other player in this game) may present a notification as indicated by an interactive notification 401a, labeled "Available for tasks:", and depicting a virtual vehicle correlated to unique digital article 15a. Accordingly, Alice may initiate an invitation to the prospective temporary player controlling character 17b. Upon acceptance of the invitation, Bob temporarily takes control of unique digital article 15a and its correlated virtual vehicle, for the duration of a particular task. Alice may entice Bob by offering (potentially conditional, or partially conditional) consideration as part of the invitation. In mutually beneficial cases, both Alice and Bob may offer (potentially conditional, or partially conditional) considerations as part of the invitation. In some implementations, consideration may depend at least in part on the result or outcome of the particular task.

Figure 4B:
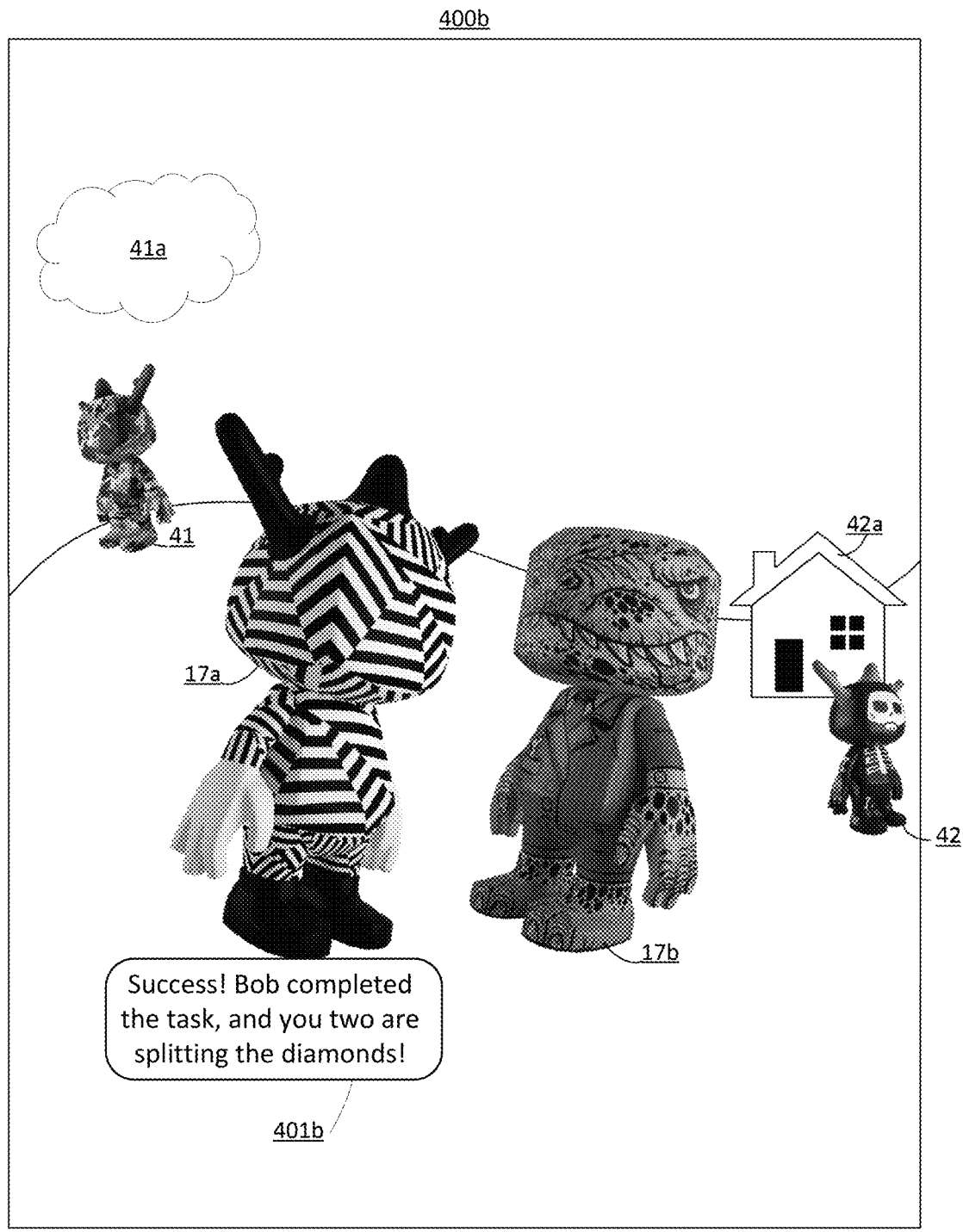

By way of non-limiting example, FIG. 4B depicts a view 400b of interactive gameplay by a particular player (say, "Alice", not depicted), using unique digital article 17a. Other players may be active and present in view 400b (depicting a topography of a simulated space included in the instance of a game), for example through a first player-controllable character 41 (standing below a cloud 41a), a second player-controllable character 42 (standing near an in-game structure 42a that looks like a house), and a character 17b (here, a "BOSS DINO BLANKO", which may be owned by a prospective temporary player, say "Bob"). Alice (or any other player in this game) may be presented with a notification as indicated by a notification 401b, stating "Success! Bob completed the task, and you two are splitting the diamonds!". Presumably this task was completed by Bob by using unique digital article 15a. Upon detection of the end of this specific task, Bob's temporary control of unique digital article 15a and its correlated virtual vehicle may be automatically reverted (e.g., without requiring further control input from Alice or Bob). In some cases, splitting the diamonds may also occur automatically, e.g., as performed by a smart contract (or a function included in a smart contract). In other cases, any prizes may be held by an independent third party (e.g., an escrow account), and subsequently divided as agreed upon prior to the start of the task.

Referring to FIG. 1, user interfaces 125 may be configured to facilitate interaction between players 123 and system 100 and/or between players 123 and client computing platforms 104. For example, user interfaces 125 may provide an interface through which players 123 may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other player interface devices configured to receive and/or convey player input. In some implementations, one or more user interfaces 125 may be included in one or more client computing platforms 104. In some implementations, one or more user interfaces 125 may be included in system 100. In some implementations, user interface 125 may be a type of interface that facilitates the exchange of virtual items between players.

Referring to FIG. 1, in some implementations, online gaming platforms 105, server(s) 102, client computing platform(s) 104, administration servers 115, registry servers 111, real-world information servers 119, and/or external resources 138 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which online gaming platforms 105, server(s) 102, client computing platform(s) 104, administration servers 115, registry servers 111, and/or external resources 138 may be operatively linked via some other communication media.

A given client computing platform 104 may include one or more processors configured to execute computer program components. The computer program components may be configured to enable an expert or player associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms. In some implementations, individual client computing platforms 104 may be configured to determine geolocation information for a current location of the individual client computing platforms 104. For example, an individual client computing platform 104 may include a geolocation sensor (e.g., a Global Positioning System or GPS device). The geolocation sensor may be configured to generate output signals conveying GPS information (e.g., a set or range of GPS coordinates) and/or other geolocation information, which may be used by the individual client computing platform 104 to determine the current location of the individual client computing platform 104.

Administration server(s) 115 may include one or more of servers 102a, processors 132a, machine-readable instructions 106a, electronic storage 130a, and/or other components. Server(s) 102a may be configured by machine-readable instructions 106a. Machine-readable instructions 106a may include one or more instruction components. The instruction components may include one or more of input component 135, communication component 137, and/or other instruction components. Administration server 115 may include communication lines, or ports to enable the exchange of information with a network and/or other computing platforms. In some implementations, administration servers 115 may be used by one or more administrative users, e.g., to configure and/or control operation of system 100. In some implementations, administrative servers 115 may include or use one or more player interfaces to receive player input and/or otherwise interact with one or more administrative users.

External resources 138 may include sources of information outside of system 100, external entities participating with system 100, external providers of computation and/or storage services, and/or other resources. In some implementations, some or all of the functionality attributed herein to external resources 138 may be provided by resources included in system 100. In some implementations, one or more external resources 138 may provide information (e.g., event information regarding events that are occurring and/or have occurred in the real world) to transformation component 139, real-world information server 119, and/or other components of system 100. In some implementations, external resources 138 may include one or more real-world information servers or blockchain oracles.

Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, 122, 124, 126, 128, 131, 134, 135, 136, 137, 139, and/or 141, and/or other components. Processor(s) 132 may be configured to execute components 108, 110, 112, 114, 116, 118, 120, 122, 124, 126, 128, 131, 134, 135, 136, 137, 139, and/or 141, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, 124, 126, 128, 131, 134, 135, 136, 137, 139, and/or 141 are illustrated in FIG. 1 as being implemented within a single processing unit, in implementations in which processor(s) 132 includes multiple processing units, one or more of components 108, 110, 112, 114, 116, 118, 120, 122, 124, 126, 128, 131, 134, 135, 136, 137, 139, and/or 141 may be implemented remotely from the other components. The description of the functionality provided by the different components 108, 110, 112, 114, 116, 118, 120, 122, 124, 126, 128, 131, 134, 135, 136, 137, 139, and/or 141 described below is for illustrative purposes only, and is not intended to be limiting, as any of components 108, 110, 112, 114, 116, 118, 120, 122, 124, 126, 128, 131, 134, 135, 136, 137, 139, and/or 141 may provide more or less functionality than is described. For example, one or more of components 108, 110, 112, 114, 116, 118, 120, 122, 124, 126, 128, 131, 134, 135, 136, 137, 139, and/or 141 may be eliminated, and some or all of its functionality may be provided by other ones of components 108, 110, 112, 114, 116, 118, 120, 122, 124, 126, 128, 131, 134, 135, 136, 137, 139, and/or 141. As another example, processor(s) 132 may be configured to execute one or more additional components that may perform some or all of the functionality attributed below to one of components 108, 110, 112, 114, 116, 118, 120, 122, 124, 126, 128, 131, 134, 135, 136, 137, 139, and/or 141.

Figure 2:
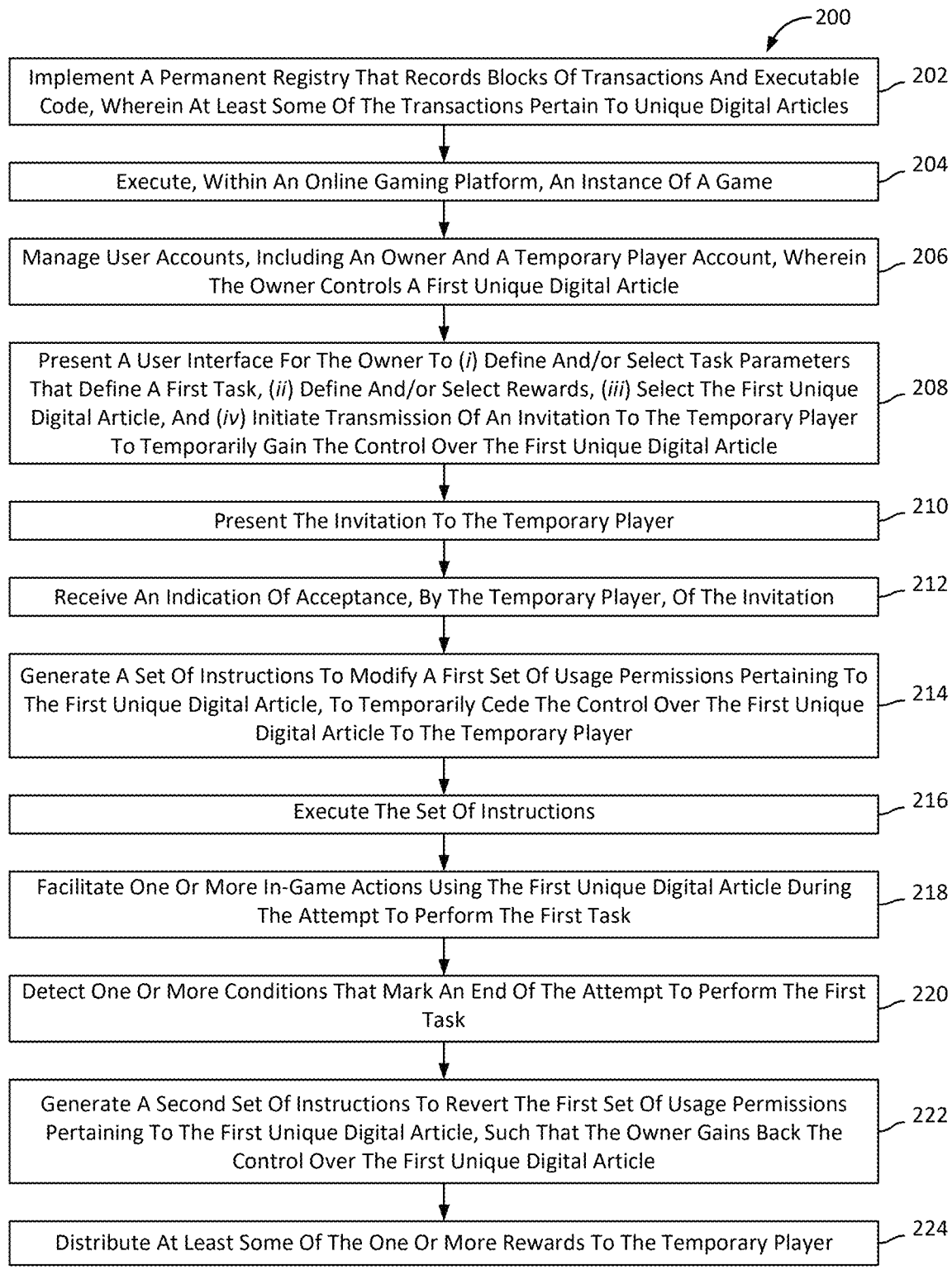
FIG. 2 illustrates a method of facilitate temporary ceding of control over unique digital articles for performance of player-specified tasks, in accordance with one or more implementations.

FIG. 2 illustrates a method 200 of facilitating temporary ceding of control over unique digital articles for performance of player-specified tasks, wherein the unique digital articles are correlated with correlated in-game entities configured to be used in instances of games within an online gaming platform, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, a permanent registry is implemented that records blocks of transactions and executable code. At least some of the transactions pertain to the unique digital articles. The unique digital articles include a first unique digital article that is correlated with a first correlated in-game entity usable in the instances of the games within the online gaming platform. In some embodiments, operation 202 is performed by a registry server the same as or similar to registry server 111a (shown in FIG. 1 and described herein).

At an operation 204, an instance of a game is executed within the online gaming platform to facilitate presentation of the game to players, and in-game actions are implemented in the instance of the game in response to in-game action instructions for the in-game actions by the players. Presentation of the game is based on views of the game that are determined during execution of the instance of the game. The players include an owner (or owning player) and a temporary player. In some embodiments, operation 204 is performed by a game component and/or an interaction component the same as or similar to game component 108 and/or interaction component 110 (shown in FIG. 1 and described herein).

At an operation 206, player accounts associated with the players are managed. The player accounts include an owner account associated with the owner and a second account associated with the temporary player. The owner has control of the usage of a first unique digital article that is correlated with a first correlated in-game entity configured to be used in the instance of the game. In some embodiments, operation 206 is performed by an account component the same as or similar to account component 112 (shown in FIG. 1 and described herein).

At an operation 208, a first presentation of a first user interface is presented, the first user interface being configured to obtain entry of user input from the owner to (i) define and/or select one or more task parameters that define a first task and a first objective of the first task, (ii) define and/or select one or more rewards related to the first task, (iii) select the first unique digital article, and (iv) initiate transmission of information representing an invitation for the temporary player to temporarily gain the control over the first unique digital article during an attempt to perform the first task. The first task includes one or more in-game actions that can be performed in the instance of the game. The first objective represents a desired outcome for completion of the first task. In some embodiments, operation 208 is performed by an invitation component the same as or similar to invitation component 116 (shown in FIG. 1 and described herein).

At an operation 210, a presentation of the invitation is presented to the temporary player. In some embodiments, operation 210 is performed by a presentation component the same as or similar to presentation component 131 (shown in FIG. 1 and described herein).

At an operation 212, an indication of an acceptance is received, from the client computing platform associated with the temporary player, of the invitation. In some embodiments, operation 212 is performed by a presentation component the same as or similar to presentation component 131 (shown in FIG. 1 and described herein).

At an operation 214, responsive to the acceptance, a set of instructions is generated to modify a first set of usage permissions pertaining to the first unique digital article. The first set of usage permissions is modified to temporarily cede the control over the first unique digital article to the temporary player. In some embodiments, operation 214 is performed by a registry component the same as or similar to registry component 128 (shown in FIG. 1 and described herein).

At an operation 216, the set of instructions is executed. In some embodiments, operation 216 is performed by a registry component the same as or similar to registry component 128 (shown in FIG. 1 and described herein).

At an operation 218, responsive to the first set of usage permissions as recorded indicating the temporary player has gained the control over the first unique digital article, facilitating one or more in-game actions using the first unique digital article during the attempt to perform the first task. The one or more in-game actions are performed as instructed by the temporary player. In some embodiments, operation 218 is performed by an interaction component the same as or similar to interaction component 110 (shown in FIG. 1 and described herein).

At an operation 220, one or more conditions that mark an end of the attempt to perform the first task are detected. In some embodiments, operation 220 is performed by a duration component the same as or similar to duration component 124 (shown in FIG. 1 and described herein).

At an operation 222, responsive to the detection, generating a second set of instructions to revert the first set of usage permissions pertaining to the first unique digital article, such that the owner gains back the control over the first unique digital article, and such that the temporary player no longer has the control over the first unique digital article. In some embodiments, operation 222 is performed by a registry component the same as or similar to registry component 128 (shown in FIG. 1 and described herein).

At an operation 224, at least some of the one or more rewards are distributed to the temporary player. In some embodiments, operation 224 is performed by a distribution component the same as or similar to distribution component 122 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. It is to be understood that the present technology contemplates that, to the extent possible, one or more features of any implementation can be combined with features of any other implementation.

What is claimed is:

1. A system configured to facilitate temporary ceding of control over unique digital articles for performance of player-specified tasks, wherein the unique digital articles are correlated with correlated in-game entities configured to be used in instances of games within an online gaming platform, the system comprising:
   a registry server including one or more processors configured by one or more machine-readable instructions to:
      implement a permanent registry configured to record blocks of transactions and executable code, wherein at least some of the transactions pertain to the unique digital articles, wherein the unique digital articles include a first unique digital article that is correlated with a first correlated in-game entity configured to be used in the instances of the games within the online gaming platform; and
      receive and execute instructions to record additional blocks of transactions on the permanent registry; and
   the online gaming platform including one or more hardware processors configured by machine-readable instructions to:
      execute, within the online gaming platform, an instance of a game to facilitate presentation of the game to players, and implement in-game actions in the instance of the game in response to in-game action instructions for the in-game actions by the players, wherein the presentation of the game is based on views of the game that are determined during execution of the instance of the game, wherein the players include an owner and a temporary player;
      manage player accounts associated with the players, wherein the player accounts include an owner account associated with the owner and a second account associated with the temporary player, wherein the owner has control over the first unique digital article by virtue of a first set of usage permissions recorded on the permanent registry; and effectuate a first presentation of a first user interface, the first user interface being configured to obtain entry of user input from the owner to:
  (i) define and/or select one or more task parameters that define a first task and a first objective of the first task, wherein the first task includes one or more in-game actions that can be performed in the instance of the game, wherein the first objective represents an outcome for completion of the first task,
  (ii) define and/or select one or more rewards related to the first task;
  (iii) select the first unique digital article, and
  (iv) initiate transmission of information representing an invitation for the temporary player to temporarily gain the control over the first unique digital article during an attempt to perform the first task;
receive, from the client computing platform associated with the temporary player, an indication of an acceptance by the temporary player of the invitation; and
responsive to the acceptance, generate and transfer a first set of instructions to the registry server, wherein the first set of instructions modify the first set of usage permissions pertaining to the first unique digital article, wherein the first set of usage permissions is modified to temporarily cede the control over the first unique digital article to the temporary player;
responsive to the first set of usage permissions as recorded indicating the temporary player has gained the control over the first unique digital article, facilitate one or more in-game actions using the first unique digital article during the attempt to perform the first task, wherein the one or more in-game actions are performed as instructed by the temporary player;
detect one or more conditions that mark an end of the attempt to perform the first task;
responsive to the detection, generate and transfer a second set of instructions to the registry server, wherein the second set of instructions automatically reverts the first set of usage permissions pertaining to the first unique digital article, such that the owner gains back the control over the first unique digital article, and such that the temporary player no longer has the control over the first unique digital article; and
distribute at least some of the one or more rewards to the temporary player.

2. The system of claim 1, wherein managing the owner account is accomplished at least in part through a first cryptographic wallet, wherein managing the second account is accomplished at least in part through a second cryptographic wallet, wherein execution of the first set of instructions transfers the first unique digital article from the first cryptographic wallet to the second cryptographic wallet, and wherein reverting the first set of usage permissions is accomplished by executing one or more instructions that effectuate a transfer of the first unique digital article from the second cryptographic wallet to the first cryptographic wallet.

3. The system of claim 1, wherein during the attempt to perform the first task, the using of the first unique digital article includes gameplay within the online gaming platform using the first correlated in-game entity exclusively by the temporary player, and not by the owner.

4. The system of claim 1, wherein during the attempt to perform the first task, the first unique digital article is prevented from being sold to other players.

5. The system of claim 1, wherein the set of instructions further defines the end of the attempt to perform the first task.

6. The system of claim 1, wherein the first task includes at least one of a competition, a battle, a race, a hunt, a delivery, a retrieval of one or more virtual items, a gathering of virtual resources, and/or a search within the online gaming platform.

7. The system of claim 1, wherein at least some of the one or more rewards are conditioned upon results obtained by the temporary player during the attempt to perform the first task.

8. The system of claim 7, wherein at least some of the one or more rewards are held in an escrow account during the attempt to perform the first task.

9. The system of claim 7, wherein the user input may further enable the owner to:
  (v) define how earnings resulting from the attempt to perform the first task are divided between the owner and the temporary player.

10. The system of claim 9, wherein the user input may further enable the owner to:
  (vi) define and/or select at least one of an owner's consideration and/or an owner's incentive for the owner that is provided or will be provided by the temporary player.

11. A method of facilitating temporary ceding of control over unique digital articles for performance of player-specified tasks, wherein the unique digital articles are correlated with correlated in-game entities configured to be used in instances of games within an online gaming platform, the method comprising:
  implementing a permanent registry that records blocks of transactions and executable code, wherein at least some of the transactions pertain to the unique digital articles, wherein the unique digital articles include a first unique digital article that is correlated with a first correlated in-game entity usable in the instances of the games within the online gaming platform;
  executing, within the online gaming platform, an instance of a game to facilitate presentation of the game to players, and implementing in-game actions in the instance of the game in response to in-game action instructions for the in-game actions by the players, wherein the presentation of the game is based on views of the game that are determined during execution of the instance of the game, wherein the players include an owner and a temporary player;
  managing player accounts associated with the players, wherein the player accounts include an owner account associated with the owner and a second account associated with the temporary player, wherein the owner has control over the first unique digital article by virtue of a first set of usage permissions recorded on the permanent registry; and
  effectuating a first presentation of a first user interface that obtains entry of user input from the owner to (i) define and/or select one or more task parameters that define a first task and a first objective of the first task, wherein the first task includes one or more in-game actions that can be performed in the instance of the game, wherein the first objective represents an outcome for completion of the first task, (ii) define and/or select one or more rewards related to the first task, (iii) select the first unique digital article, and (iv) initiate transmission of information representing an invitation for the temporary player to temporarily gain the control over the first unique digital article during an attempt to perform the first task;

receiving, from the client computing platform associated with the temporary player, an indication of an acceptance by the temporary player of the invitation;

responsive to the acceptance, generating a first set of instructions to modify the first set of usage permissions pertaining to the first unique digital article, wherein the first set of usage permissions is modified to temporarily cede the control over the first unique digital article to the temporary player;

executing the first set of instructions;

responsive to the first set of usage permissions as recorded indicating the temporary player has gained the control over the first unique digital article, facilitating one or more in-game actions using the first unique digital article during the attempt to perform the first task, wherein the one or more in-game actions are performed as instructed by the temporary player;

detecting one or more conditions that mark an end of the attempt to perform the first task;

responsive to the detection, generating a second set of instructions to revert the first set of usage permissions pertaining to the first unique digital article, such that the owner gains back the control over the first unique digital article, and such that the temporary player no longer has the control over the first unique digital article; and distributing at least some of the one or more rewards to the temporary player.

12. The method of claim 11, wherein managing the owner account is accomplished at least in part through a first cryptographic wallet, wherein managing the second account is accomplished at least in part through a second cryptographic wallet, wherein execution of the first set of instructions transfers the first unique digital article from the first cryptographic wallet to the second cryptographic wallet, and wherein reverting the first set of usage permissions is accomplished by executing one or more instructions that effectuate a transfer of the first unique digital article from the second cryptographic wallet to the first cryptographic wallet.

13. The method of claim 11, wherein during the attempt to perform the first task, the using of the first unique digital article includes gameplay within the online gaming platform using the first correlated in-game entity exclusively by the temporary player, and not by the owner.

14. The method of claim 11, wherein during the attempt to perform the first task, the first unique digital article is prevented from being sold to other players.

15. The method of claim 11, wherein the set of instructions further defines the end of the attempt to perform the first task.

16. The method of claim 11, wherein the first task includes at least one of a competition, a battle, a race, a hunt, a delivery, a retrieval of one or more virtual items, a gathering of virtual resources, and/or a search within the online gaming platform.

17. The method of claim 11, wherein at least some of the one or more rewards are conditioned upon results obtained by the temporary player during the attempt to perform the first task.

18. The method of claim 17, wherein at least some of the one or more rewards are held in an escrow account during the attempt to perform the first task.

19. The method of claim 17, wherein the user input may further enable the owner to:

(v) define how earnings resulting from the attempt to perform the first task are divided between the owner and the temporary player.

20. The method of claim 19, wherein the user input may further enable the owner to:

(vi) define and/or select at least one of an owner's consideration and/or an owner's incentive for the owner that is provided or will be provided by the temporary player.

* * * * *